US010305601B2

United States Patent
Seyedi

(10) Patent No.: US 10,305,601 B2
(45) Date of Patent: May 28, 2019

(54) OPTICAL CHANNEL-TO-WAVELENGTH TUNING

(71) Applicant: Hewlett Packard Enterprise Development LP, Houston, TX (US)

(72) Inventor: Ashkan Seyedi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/691,894

(22) Filed: Aug. 31, 2017

(65) Prior Publication Data

US 2019/0068291 A1     Feb. 28, 2019

(51) Int. Cl.
| | | |
|---|---|---|
| H04B 10/50 | (2013.01) | |
| H04B 10/67 | (2013.01) | |
| H04J 14/02 | (2006.01) | |
| H04B 10/572 | (2013.01) | |

(52) U.S. Cl.
CPC ......... *H04B 10/572* (2013.01); *H04B 10/506* (2013.01); *H04B 10/67* (2013.01); *H04J 14/02* (2013.01)

(58) Field of Classification Search
CPC ..... H04B 10/506; H04B 10/572; G02F 1/025; G02F 1/225; G02F 2201/16; G02B 6/29364; G02B 6/4215
See application file for complete search history.

(56) References Cited

U.S. PATENT DOCUMENTS

| | | | |
|---|---|---|---|
| 5,825,792 A | 10/1998 | Villeneuve et al. | |
| 6,233,262 B1 | 5/2001 | Mesh et al. | |
| 9,614,623 B2 | 4/2017 | Gottfried et al. | |
| 2010/0329685 A1 | 12/2010 | Zheng et al. | |
| 2014/0241726 A1 | 8/2014 | Ho et al. | |
| 2015/0055960 A1 | 2/2015 | Zheng et al. | |
| 2015/0261061 A1* | 9/2015 | Akiyama | ................ G02F 1/225 385/2 |

(Continued)

FOREIGN PATENT DOCUMENTS

| | | |
|---|---|---|
| WO | 2016027132 | 2/2016 |
| WO | 2017014753 | 1/2017 |

OTHER PUBLICATIONS

Optical Networking, Optical Networking Technology—Cisco, Accessed Jul. 6, 2017, online <http://www.cisco.com/c/en/us/products/optical-networking/technology.html>.

(Continued)

*Primary Examiner* — Casey L Kretzer
(74) *Attorney, Agent, or Firm* — Michael A. Dryja

(57) ABSTRACT

An optical system includes an optical transmitter having optical transmission channels and an optical receiver having optical reception channels. The optical transmission channels are successively tuned to resonant wavelengths at which lowest transmission channel input currents result in transmission channel output current peaks greater than a threshold. The optical reception channels are tuned to the resonant wavelengths after the optical transmission channels are tuned. Each resonant wavelength has the optical reception channel tuned thereto that has a highest reception channel output current peak at a lowest reception channel input current when the optical transmission channel tuned to the resonant wavelength is temporarily detuned.

18 Claims, 6 Drawing Sheets

(56) References Cited

U.S. PATENT DOCUMENTS

2015/0316794 A1    11/2015  Hayakawa
2017/0019168 A1     1/2017  Menard et al.
2017/0105060 A1     4/2017  Oltman et al.

OTHER PUBLICATIONS

Li, Cheng et al., "Silicon Photonic Transceiver Circuits With Microring Resonator Bias-Based Wavelength Stabilization in 65 nm CMOS", IEEE Journal of Solid-State Circuits, vol. 49, No. 6, Jun. 2014.

Padmaraju, K. et al., "Wavelength Locking and Thermally Stabilizing Microring Resonators Using Dithering Signals", Journal of Lightwave Technology, vol. 32, No. 3, Feb. 1, 2014.

Michael S. Borella et al., Optical Components for WDM Lightwave Networks', In: Proceedings of the IEEE (vol. 85, Issue: 8), pp. 1274-1307, Aug. 1997.

International Search Report and Written Opinion received for PCT Patent Application No. PCT/US2018/049252, dated Dec. 12, 2018, 8 pages.

* cited by examiner

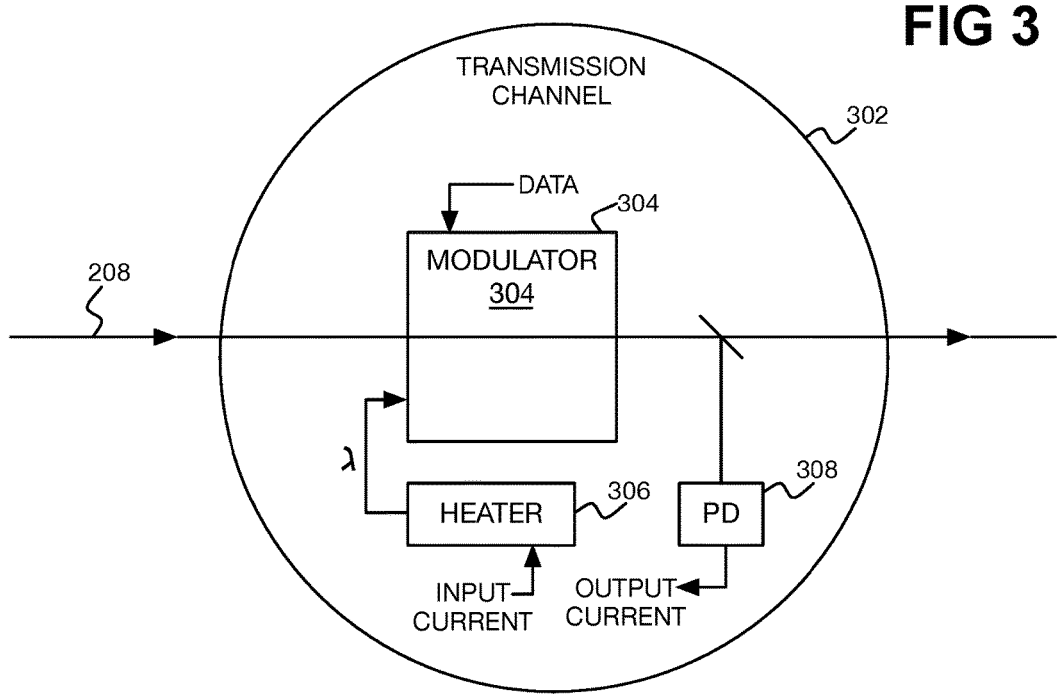
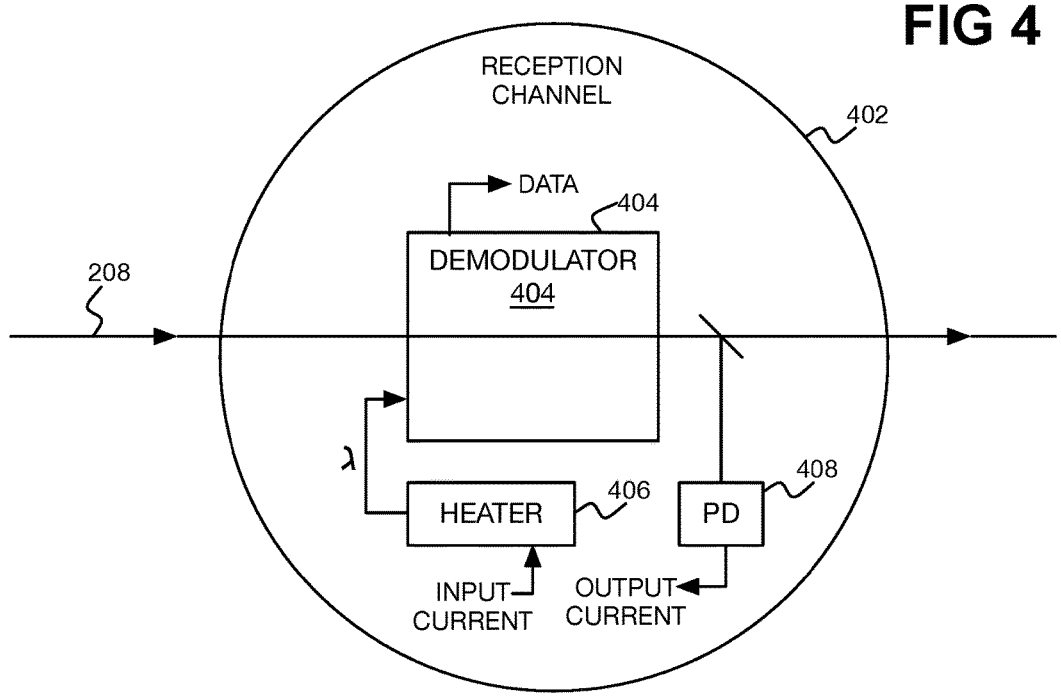

OPTICAL CHANNEL-TO-WAVELENGTH TUNING

BACKGROUND

Computing systems can include different nodes, which may be separate integrated circuits or separate computing devices such as computers, network devices like switches, and so on. Nodes can communicate with one another in a variety of different ways. For example, conductive cabling may interconnect nodes, such that data is electrically transferred between the nodes over electrical conductors within the cabling. As another example, nodes can communicate with one another wirelessly. As a third example, optical cabling may interconnect nodes, such that data is optically transferred between the nodes over optical fiber within the cabling.

BRIEF DESCRIPTION OF THE DRAWINGS

FIG. 3 is a diagram of an example optical transmission channel of an optical transmitter.

FIG. 4 is a diagram of an example optical reception channel of an optical receiver.

DETAILED DESCRIPTION

Figure 1:
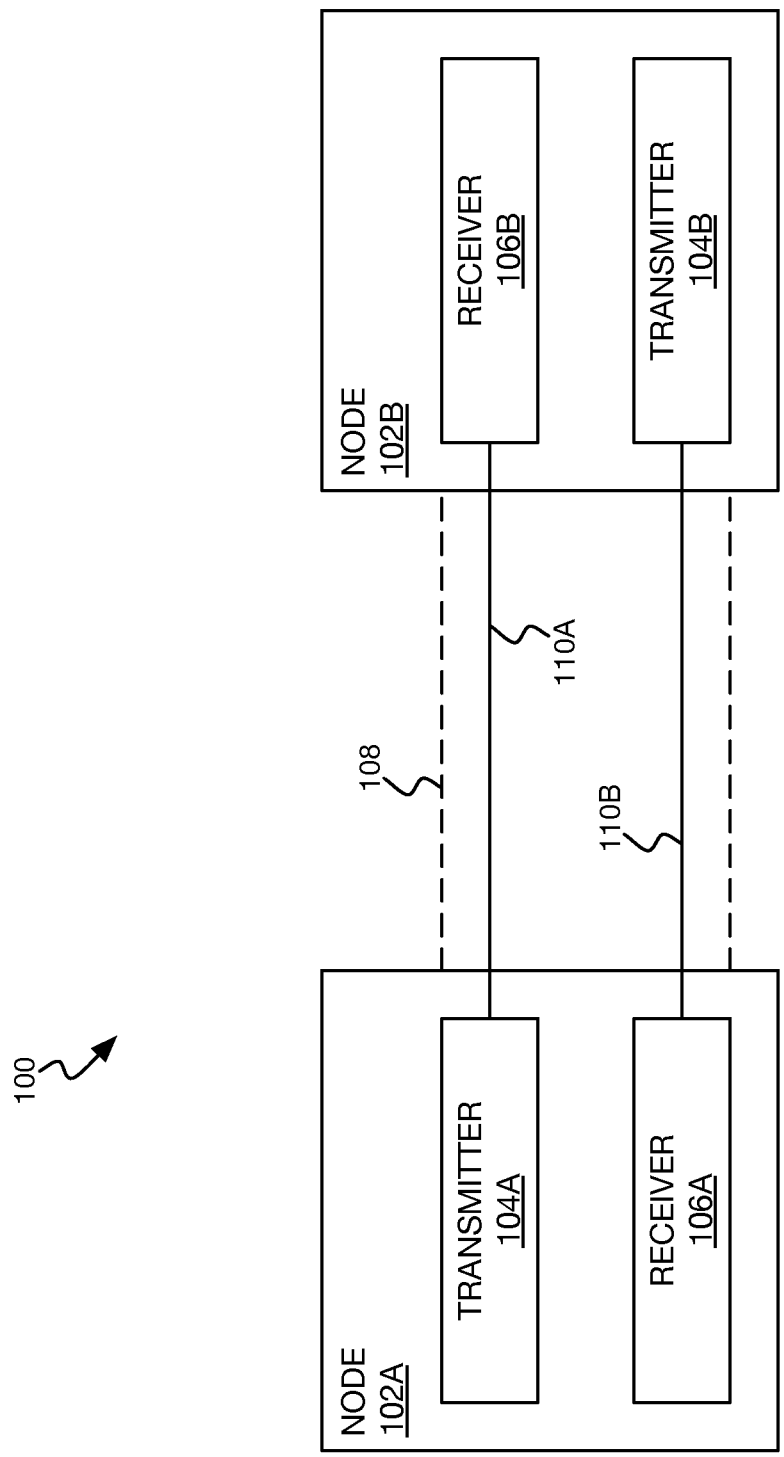
FIG. 1 is a diagram of an example system in which two nodes are optically interconnected with one another.

As noted in the background section, nodes of a computing system can communicate with one another in a variety of different ways, including optically, in which two nodes are optically interconnected to each other by optical fiber. One type of optical communication scheme is wavelength-division multiplexing. In wavelength-division multiplexing, multiple bits of information can be simultaneously transmitted between nodes over the same optical fiber by multiplexing the bits on different optical wavelengths. Wavelength-division multiplexing includes coarse wavelength-division multiplexing and dense wavelength-division multiplexing, which can differ at least in the spacing between the different wavelengths that are used for multiplexing data.

Each node of a pair of nodes that are optically interconnected to one another can include an optical transmitter and an optical receiver. The optical transmitter of one node and the optical receiver of another node are optically connected to the same optical fiber(s), for optical transmission of data from the former node to the latter node. The optical transmitter includes a number of optical transmission channels, which may be optical ring resonators, and the optical receiver includes a corresponding number of optical reception channels, which also may be optical ring resonators. The channels can correspond to different bits of data. For example, if there are eight optical transmission channels and eight optical reception channels, then eight bits of data can be simultaneously transmitted on the same optical fiber(s) over eight different wavelengths using wavelength-division multiplexing.

Before data can be properly transmitted between an optical transmitter and an optical receiver, wavelengths over which data will be sent from the transmitter to the receiver are selected, and the optical transmission channels of the transmitter and the optical reception channels of the receiver are tuned to these wavelengths. Furthermore, the optical transmission channel and the optical reception channel tuned to each selected wavelength are mapped to one another. That is, the optical reception channels and the optical transmission channels are mapped to one another by wavelength so that it is known which pair of optical transmission and reception channels have been tuned to each wavelength. Mapping which optical reception channels correspond to which optical transmission channels in this manner particularly permits the optical receiver to properly discern and decode data transmitted by the optical transmitters.

Techniques described herein map optical channels to wavelengths in a way that reduces power consumption at both the optical transmitter and the optical receiver. The optical transmission channels of the optical transmitter are first tuned to wavelengths, and then the optical reception channels of the optical receiver are tuned to these same wavelengths. Specifically, the optical transmission channels are successively tuned to wavelengths at which the lowest transmission channel input currents result in transmission channel output current peaks greater than a threshold. That is, on a channel-by-channel basis, each transmission channel is tuned to the wavelength at which the lowest input current results in an output current peak greater than a threshold. Selecting which transmission channels are tuned to which wavelengths in this manner reduces power consumption, by minimizing the amount of current that is used by the resistive heaters of the channels to lock onto their respective wavelengths.

The input current of an optical transmission channel controls the wavelength to which the transmission channel is tuned. The input current can be the input current applied to a resistive heater of the optical transmission channel to select a particular wavelength of a number of wavelengths that a comb laser source, or other optical beam source, outputs. The output current of an optical transmission channel can be the output current of a photoconductor that provides feedback as to whether a resonant wavelength—i.e., one of the wavelengths output by the comb laser source—has been locked onto (viz., tuned to) by the transmission channel at the presently applied input current.

Once the optical transmission channels have been tuned to the wavelengths, the optical reception channels of the optical receiver are tuned to these same wavelengths. Each wavelength has the optical reception channel tuned thereto that has a highest reception channel output current peak at a lowest reception channel input current when the optical transmission channel tuned to this wavelength is temporarily detuned from the wavelength. That is, the wavelengths to which the optical transmission channels have been tuned are temporarily detuned on a transmission channel-by-transmission channel basis; the optical reception channel that has not yet been tuned and that has a highest output current peak at a lowest input current is tuned to the currently detuned wavelength. Selecting which reception channels are tuned to which wavelengths in this manner reduces power consumption, by minimizing the amount of current that is used by the resistive heaters of the channels to lock onto their respective wavelengths.

As with the optical transmission channels of the optical transmitter, the input current of an optical reception channel of the optical receiver controls the wavelength to which the reception channel is tuned. This input current can be the input current applied to a resistive heater of the reception channel to select a particular wavelength of a number of wavelengths that the comb laser source outputs. Also as with the optical transmission channels, the output current of an optical reception channel can be the output current of a photoconductor that provides feedback as to whether such a resonant wavelength has been locked onto by the reception channel at the presently applied input current.

FIG. 1 shows an example system 100 including two nodes 102A and 102B, which are collectively referred to as the nodes 102, and which are each individually referred to as a node 102. Each node 102 can be a separate integrated circuit or a separate computing devices such as a computer, a network device like a switch, and so on. The system 100 can include more than two nodes 102 as well.

The node 102A includes an optical transmitter 104A and the node 102B includes an optical transmitter 104B. The optical transmitters 104A and 104B are collectively referred to as the optical transmitters 104, and are each individually referred to as an optical transmitter 104. The node 102A includes an optical receiver 106A and the node 102B includes an optical receiver 106B. The optical receivers 106A and 106B are collectively referred to as the optical receivers 106, and are each individually referred to as an optical receiver 106.

Optical cabling 108 interconnects the nodes 102 to one another. The optical cabling 108 can include at least two optical fibers 110A and 110B, which are collectively referred to as the optical fibers 110, and which are each individually referred to as an optical fiber 110. The optical fiber 110A interconnects the optical transmitter 104A of the node 102A to the optical receiver 106B of the node 102B, and the optical fiber 110B interconnects the optical transmitter 104B of the node 102B to the optical receiver 106A of the node 102A. More generally, each optical transmitter 104 is interconnected to a corresponding optical receiver 106 via at least one optical fiber 110. The node 102A thus transmits data to the node 102B over the optical fiber 110A, and the node 102B transmits data to the node 102A over the optical fiber 110B.

Figure 2:
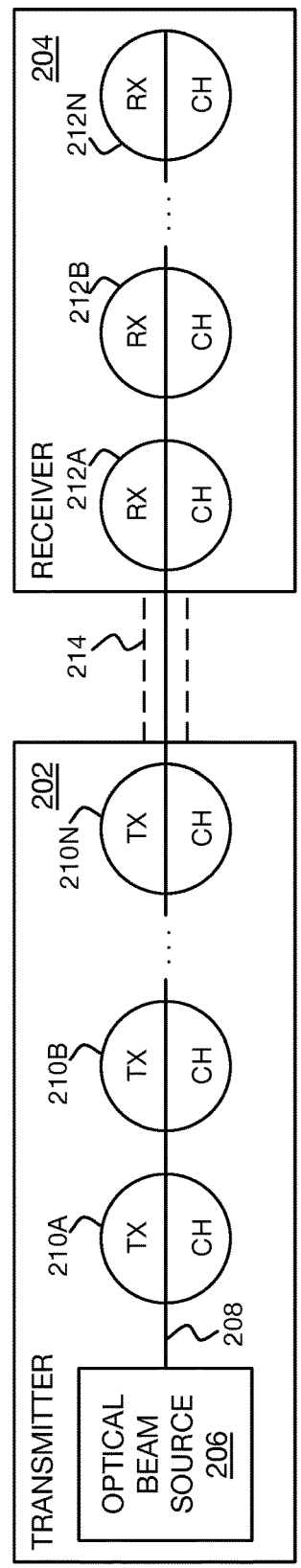
FIG. 2 is a diagram of an example pair of an optical transmitter and an optical receiver.

FIG. 2 shows an example pair of an optical transmitter 202 and an optical receiver 204 in more detail. The optical transmitter 104A and the optical receiver 106A of FIG. 1 can be implemented as the transmitter 202 and the receiver 204, respectively. The optical transmitter 104B and the optical receiver 106B of FIG. 1 can likewise be implemented as the transmitter 202 and the receiver 204.

The optical transmitter 202 includes an optical beam source 206. The optical beam source 206 can be a comb laser source. The optical beam source 206 outputs an optical beam 208 that has M wavelengths $\lambda_1, \lambda_2, \ldots, \lambda_M$ on which the optical transmitter 202 can simultaneously transmit data via wavelength-division multiplexing.

The optical transmitter 202 includes N optical transmission channels 210A, 210B, ..., 210N, which are collectively referred to as the optical transmission channels 210 and which are individually referred to as an optical transmission channel 210. The number N of the transmission channels 210 is equal to or less than the number M of wavelengths. Each transmission channel 210 can be an optical ring resonator.

The optical beam 208 can pass through each optical transmission channel 210. Each transmission channel 210 is tuned to a different wavelength $\lambda_m$. Each transmission channel 210 modulates the optical beam 208 at its tuned wavelength $\lambda_m$ in accordance with a data bitstream for which the transmission channel 210 is responsible. In this way, the optical transmitter 202 can simultaneously transmit N bits of data to the optical receiver 204 via the optical beam 208.

At least one optical fiber 214 interconnects the optical transmitter 202 to the optical receiver 204. The optical fiber 214 thus carries the optical beam 208 between the optical transmitter 202 and the optical receiver 204. The optical fiber 214 can implement the optical fiber 110A of FIG. 1 in the case in which the optical transmitter 104A and the optical receiver 106A are implemented as the transmitter 202 and the receiver 204, respectively. The optical fiber 214 can implement the optical fiber 110B of FIG. 1 in the case in which the optical transmitter 104B and the optical receiver 106B are implemented as the transmitter 202 and the receiver 204.

The optical receiver 204 includes N optical reception channels 212A, 212B, ..., 212N, which are collectively referred to as the optical reception channels 210 and which are individually referred to as an optical reception channel 212. Each reception channel 212 can be an optical ring resonator. The optical beam 208 can pass through each optical reception channel 212. Each reception channel 212 is tuned to a different wavelength $\lambda_m$. Each reception channel 212 demodulates the optical beam 208 at its tuned wavelength $\lambda_m$ to decode a data bitstream for which the reception channel 212 is responsible.

For each different wavelength $\lambda_m$ to which an optical transmission channel 210 has been tuned, a corresponding optical reception channel 212 is tuned to the same wavelength $\lambda_m$. Stated another way, there is a corresponding pair of a transmission channel 210 and a reception channel 212 for each wavelength of N<=M wavelengths. The reception channels 212 do not have to correspond to the transmission channels 210 in order. That is, the reception channel 212A does not have to correspond to the transmission channel 210A, the reception channel 212B does not have to correspond to the transmission channel 210B, and so on. Rather, one of the transmission channels 210 and one of the reception channels 212 are tuned to each wavelength of N<=M wavelengths on which the optical transmitter 202 transmits data and on which the optical receiver 204 receives data.

FIG. 3 shows an example optical transmission channel 302. Each optical transmission channel 210 of the optical transmitter 202 of FIG. 2 can be implemented as the transmission channel 302. The optical beam 208 passes through the transmission channel 302. The transmission channel 302 includes an optical modulator 304, a resistive heater 306, and a photodetector 308.

The optical modulator 304 modulates an operative wavelength selected by the resistive heater 306 in accordance to an input bitstream of data. The resistive heater 306 controls the selected wavelength in accordance with an applied input current. For instance, the greater the input current, the higher the wavelength that the resistive heater 306 selects. The operative wavelength selected by the resistive heater 306 can be considered the wavelength to which the optical transmission channel 302 has been tuned (i.e., the wavelength on which the transmission channel 302 has locked).

A photodetector 308 measures a strength, or intensity, of the operative wavelength selected by the resistive heater 306 and that the modulator 304 modulates data in accordance with an input bitstream of data. This measured strength is the output current of the photodetector 308. The output current of the photodetector 308 is in correspondence with resonance of the operative optical wavelength and the resonant wavelengths of the optical beam 208.

More specifically, the optical beam 208 includes M discrete wavelengths, but the resistive heater 306 can select any optical wavelength in accordance with its applied input current. When the resistive heater 306 has selected one of the M discrete wavelengths, the photodetector 308 outputs a peak amount of current. The greater the distance between the operative wavelength selected by the resistive heater 306 and the nearest one of the M discrete wavelengths, the lower the amount of current that the photodetector 308. At the greatest distance between the selected wavelength and the nearest one of the M wavelengths, the photodetector 308 outputs a minimum amount of current.

Furthermore, the peak amount of current that the photodetector 308 of the optical transmission channel 302 outputs when the resistive heater 306 has selected one of the M discrete wavelengths to which another transmission channel has been tuned is lower than the peak amount of current that the photodetector 308 outputs when the heater 306 has selected one of the M discrete wavelengths to which no other transmission channel has been tuned. This is because when another transmission channel has locked onto a particular wavelength of the M discrete wavelengths, the transmission channel modulates the wavelength, which decreases the strength of the optical beam 208 at this wavelength. As such, the amount of current that the photodetector 308 outputs when the resistive heater 306 has selected this wavelength decreases.

FIG. 4 shows an example optical reception channel 402. Each optical reception channel 212 of the optical receiver 204 of FIG. 2 can be implemented as the reception channel 402. The optical beam 208 passes through the reception channel 402. The reception channel 402 includes an optical demodulator 404, a resistive heater 406, and a photodetector 408.

The optical demodulator 404 demodulates an operative wavelength selected by the resistive heater 406 to provide an output bitstream of data, which is the bitstream of data that has been encoded onto the optical beam 208 at the selected wavelength. The resistive heater 406 controls the selected wavelength in accordance with an applied input current. For instance, the greater the input current, the higher the wavelength that the resistive heater 406 selects. The operative wavelength selected by the resistive heater 406 can be considered the wavelength to which the optical reception channel 402 has been tuned (i.e., the wavelength on which the reception channel 402 has locked).

A photodetector 408 measures a strength, or intensity, of the wavelength selected by the resistive heater 406 and that the demodulator 404 demodulates data from to generate an output bitstream of data. This measured strength is the output current of the photodetector 408. The output current of the photodetector 408 is in correspondence with resonance of the operative optical wavelength and the resonant wavelengths of the optical beam 208.

More specifically, and similar to the resistive heater 306 of FIG. 3, although the optical beam 208 includes M discrete wavelengths, the resistive heater 406 can select any optical wavelength in accordance with it applied input current. When the resistive heater 406 has selected one of the M discrete wavelengths, the photodetector 408 outputs a peak amount of current. The greater the distance between the operative wavelength selected by the resistive heater 406 and the nearest one of the M discrete wavelengths, the lower the amount of current that the photodetector 408. At the greatest distance between the selected wavelength and the nearest one of the M wavelengths, the photodetector 408 outputs a minimum amount of current.

Furthermore, the peak amount of current that the photodetector 408 of the optical reception channel 402 outputs when the resistive heater 406 has selected one of the M discrete wavelengths to which a transmission channel, like the transmission channel 302 of FIG. 3, has been tuned is lower than the peak amount of current that the photodetector 408 outputs when the heater 406 has selected one of the M discrete wavelengths to which no transmission channel has been tuned. This is because, as noted above, when a transmission channel has locked onto a particular wavelength of the M discrete wavelengths, the transmission channel modulates the wavelength, which decreases the strength of the optical beam 208. Therefore, the amount of current that the photodetector 408 outputs when the resistive heater 406 has selected this wavelength decreases.

Figure 5:
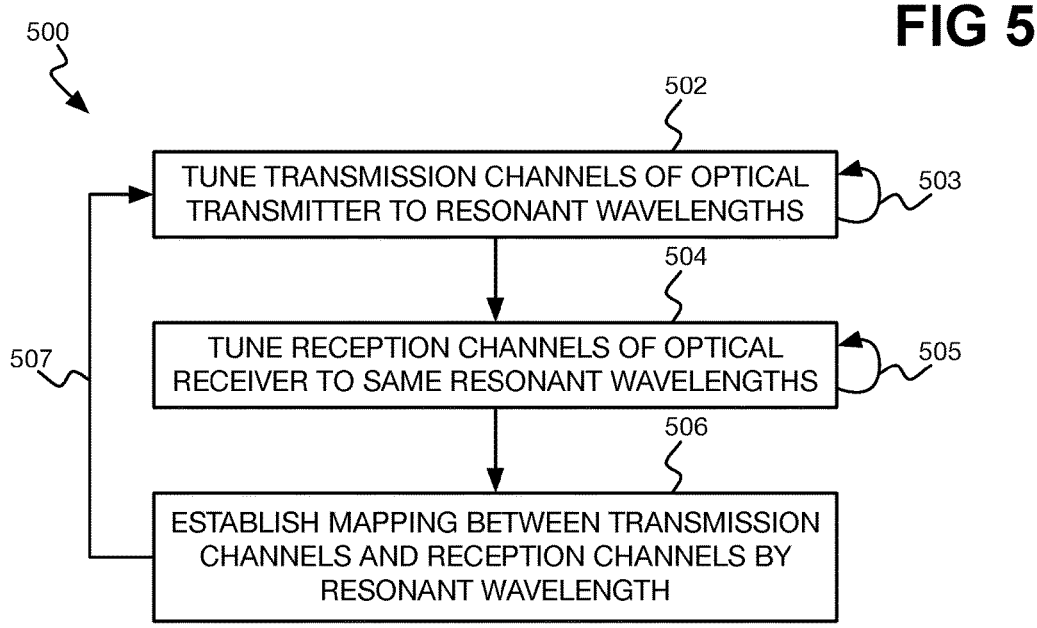
FIG. 5 is a flowchart of an example method to prepare for optical communication between an optical transmitter and an optical receiver.

FIG. 5 shows an example method 500 to prepare for optical communication between an optical transmitter and an optical receiver that are interconnected to one another via optical cabling. The transmitter and the receiver in question may each be part of a different node. Once the method 500 has been performed, the optical transmitter can optically communicate data to the optical receiver in a wave-division multiplexing manner.

The transmission channels of the optical transmitter are tuned to resonant wavelengths of the transmitter (502). The resonant wavelengths can be the discrete wavelengths of an optical beam that an optical beam source, such as a comb laser source, generates. There are at least as many resonant wavelengths as there are transmission channels. Therefore, one or more resonant wavelength may not be tuned to by any transmission channel. As described in more detail later in the detailed description, the transmission channels are successively tuned to resonant wavelengths at which lowest input currents of the channels result in output current peaks greater than a threshold. Thermal crosstalk can occur between transmission channels. As such, once the transmission channels have been tuned to resonant wavelengths, part 502 may be repeated one or more times to retune the transmission channels to dampen thermal crosstalk effects (503).

Once the transmission channels have been tuned to the resonant wavelengths, the reception channels of the optical receiver are tuned to the same resonant wavelengths (504). There are at least as many reception channels as there are transmission channels. Therefore, when one or more resonant wavelengths are not tuned to by any transmission channel, no reception channel is tuned to each such wavelength. As described in more detail later in the detailed description, each resonant wavelength to which any transmission channel has been tuned has an optical reception tuned thereto that has a highest output current peak at a lowest input current when the transmission channel tuned to this resonant wavelength is temporarily detuned. Thermal crosstalk can also occur between reception channels. As such, once the reception channels have been tuned to resonant wavelengths, part 504 may be repeated one or more times to retune the reception channels to dampen thermal crosstalk effects (505).

Once the transmission channels have been tuned to the resonant wavelengths, and once the reception channels have been tuned to these same resonant wavelengths, a mapping is established between the transmission channels and the reception channels by wavelength (506). That is, for each resonant wavelength to which a transmission channel has been tuned, a mapping is established between this transmission channel and the reception channel that is tuned to the same wavelength. This mapping particularly permits the optical receiver to properly decode data that the optical transmitter simultaneously transmits on the resonant wavelengths via wavelength-division multiplexing. The method 500 can be periodically repeated (507), to compensate for thermal variance that may occur within the optical transmitter and/or optical receiver over time.

The mapping between the optical transmission and reception channels by resonant wavelength can be established in a number of different ways in part 506. As a first example, the optical transmitter may transmit on each transmission channel data indicating the identity of the optical transmission channel. Because each optical transmission channel is tuned to a corresponding resonant wavelength, the optical receiver can map the optical reception channel tuned to this wavelength to the transmission channel indicated in the data received on the wavelength. For example, the first transmission channel and the fourth reception channel may both be tuned to a particular wavelength $\lambda_m$. The optical transmitter transmits on this wavelength the identity of the first transmission channel. The optical receiver receives this information on the particular wavelength in question via the fourth reception channel. Therefore, the optical receiver maps its fourth reception channel tuned to the wavelength on which the information arrived to the first transmission channel.

As another example, the optical transmitter may temporarily and individually detune the optical transmission channels in order. The optical receiver can thus temporally detect the resonant wavelengths on which peak output currents have temporarily increased, and correspondingly map its optical reception channels to these wavelengths. For example, the first transmission channel may be tuned to a particular wavelength $\lambda_m$. The optical transmitter temporarily detunes this transmission channel, which causes a temporary increase in the peak output current at this wavelength. The third reception channel may be tuned to the wavelength $\lambda_m$. Therefore, the optical receiver maps the third reception channel to the first transmission channel.

Figure 6:
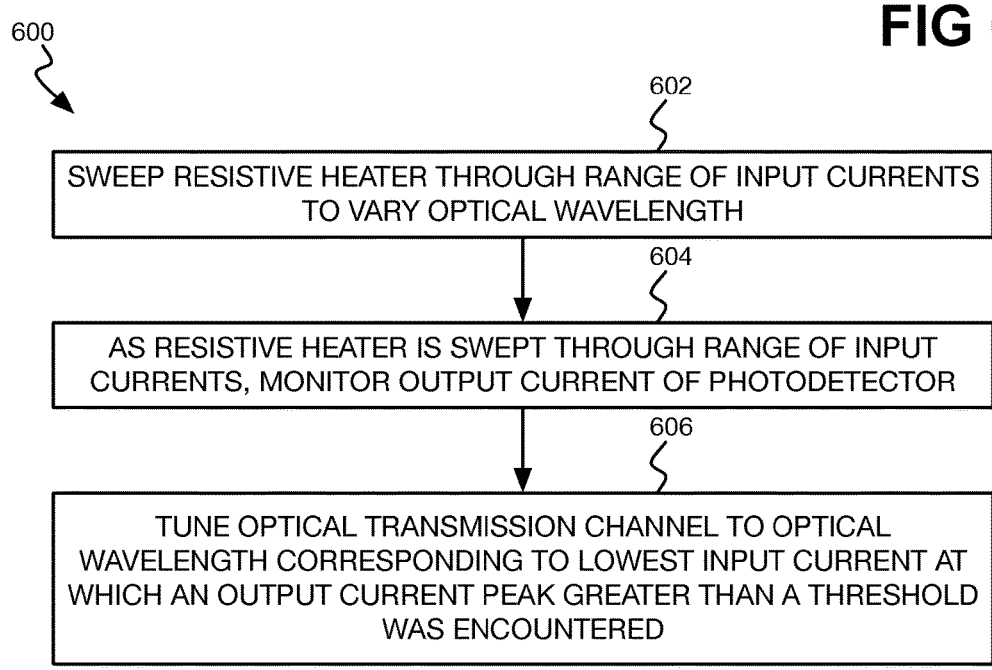
FIG. 6 is a flowchart of an example method for tuning an optical transmission channel of an optical transmitter to a resonant wavelength.

FIG. 6 shows an example method 600 for tuning an optical transmission channel of an optical transmitter to a resonant wavelength of the transmitter. The optical transmitter successively performs the method 600 for each transmission channel, such as in order from the first transmission channel to the last transmission channel, until all the transmission channels have been tuned to resonant wavelengths. Therefore, part 502 of the method 500 of FIG. 5 can be implemented performing the method 600 for each of the transmission channels of the optical transmitter. The method 600 can be implemented as program code stored on a non-transitory computer-readable data storage medium that the optical transmitter executes.

The optical transmitter sweeps the resistive heater of the optical transmission channel in relation to which the method 600 is currently being performed through a range of input currents (602). As such, the operative wavelength of the transmission channel varies. The optical transmitter monitors the output current of the photoconductor of the transmission channel in question as the resistive heater is swept through the input current range (604). The effective result is therefore a graph of photoconductor output current by transmission channel operative wavelength.

The optical transmission channel will thus momentarily lock onto each resonant wavelength of the optical transmitter as the resistive heater sweeps through the range of input currents. That is, as the resistive heater is swept through its input current range, the output current of the photoconductor moves through peaks corresponding to the resonant wavelengths of the transmitter. Therefore, parts 602 and 604 permit the optical transmitter to discern at which input current the optical transmission channel locks onto each resonant wavelength. The input current at which each output current peak occurs can be recorded; that is, as the output current peaks are encountered, they may be mapped to the input currents at which they occur.

The optical transmitter tunes the optical transmission channel to the optical wavelength that corresponds to the lowest input current at which an output current greater than a threshold was encountered during input current sweeping of the resistive heater (606). Tuning the optical transmission channel to the optical wavelength that particularly corresponds to such a lowest input current thus reduces power consumption by the optical transmitter. The threshold is selected to distinguish between resonant wavelengths to which other optical transmission channels have already been tuned (if any) and resonant wavelengths to which no optical transmission channel has yet been tuned. As noted above, once an optical transmission channel is tuned to a wavelength, the photodetector output current at this wavelength attenuates. Therefore, the threshold can be set between the output current at a wavelength to which a transmission channel has been tuned and the output current at a wavelength to which no transmission channel has been tuned. Furthermore, the threshold can be the same for each channel, or can vary on a per-channel basis. The threshold may be set by a user like an administrator.

Figure 7:
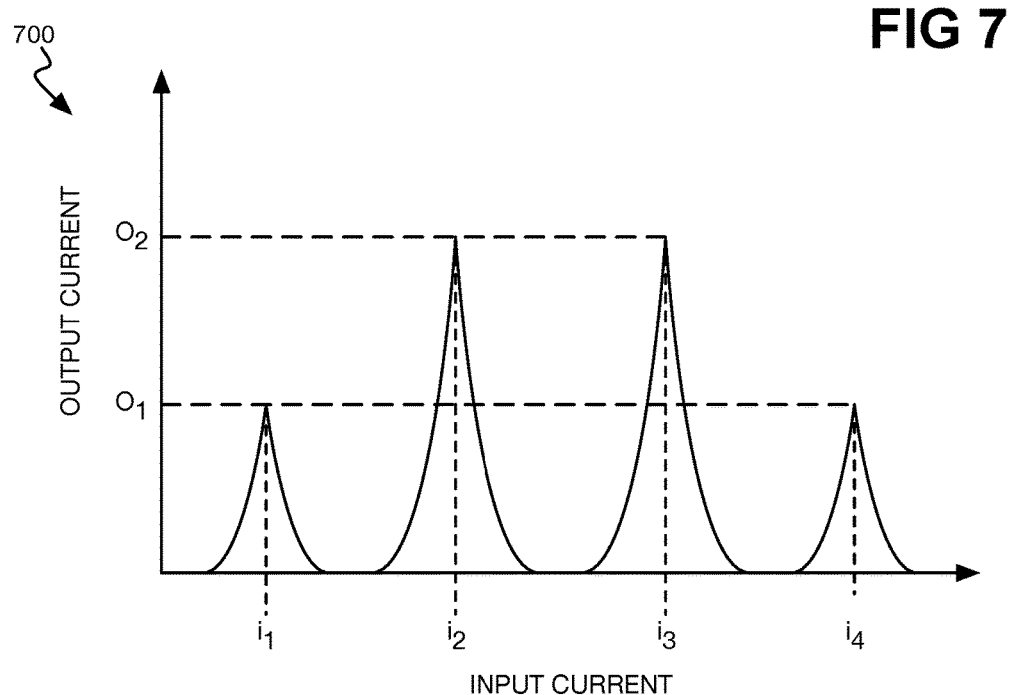
FIG. 7 is an example graph of photodetector output current by resistive heater input current for an optical transmission channel of an optical transmitter.

FIG. 7 shows an example graph 700 of photodetector output current by resistive heater input current for an optical transmission channel of an optical transmitter. The example graph 700 illustrates performance of parts 602 and 604 of the method 600 of FIG. 6. In the graph 700, there are output current peaks at the operative wavelengths corresponding to the input currents $i_1$, $i_2$, $i_3$, $i_4$. Specifically, at the input currents $i_1$, $i_4$, there is an output current $o_1$, and at the input currents $i_2$, $i_3$, there is an output current $o_2$.

The output current $o_1$ at the input currents $i_2$, $i_3$ being lower than the output current $o_2$ at the input currents $i_1$, $i_4$ signifies that other optical transmission channels have already been tuned to the resonant wavelengths corresponding to the input currents $i_1$, $i_4$. Likewise, the output current $o_2$ at the input currents $i_1$, $i_4$ being higher than the output current $o_1$ at the input currents $i_2$, $i_3$ signifies that no transmission channel has already been tuned to the resonant wavelengths corresponding to the input currents $i_2$, $i_3$. Therefore, the threshold of part 606 of the method 600 of FIG. 6 is selected to an output current between $o_1$ and $o_2$.

Furthermore, in part 606 of the method 600 of FIG. 6, the optical transmission channel is tuned to the optical wavelength corresponding to the input current $i_2$. The transmission channel is not tuned to either of the optical wavelengths corresponding to the input currents $i_3$, $i_4$, because these input currents are higher. The transmission channel is not tuned to the optical wavelength corresponding to the input current $i_1$ even though this input current is lower, because it does not corresponding to an output current greater than the threshold, indicating that another transmission channel has already been tuned to this wavelength.

Figure 8:
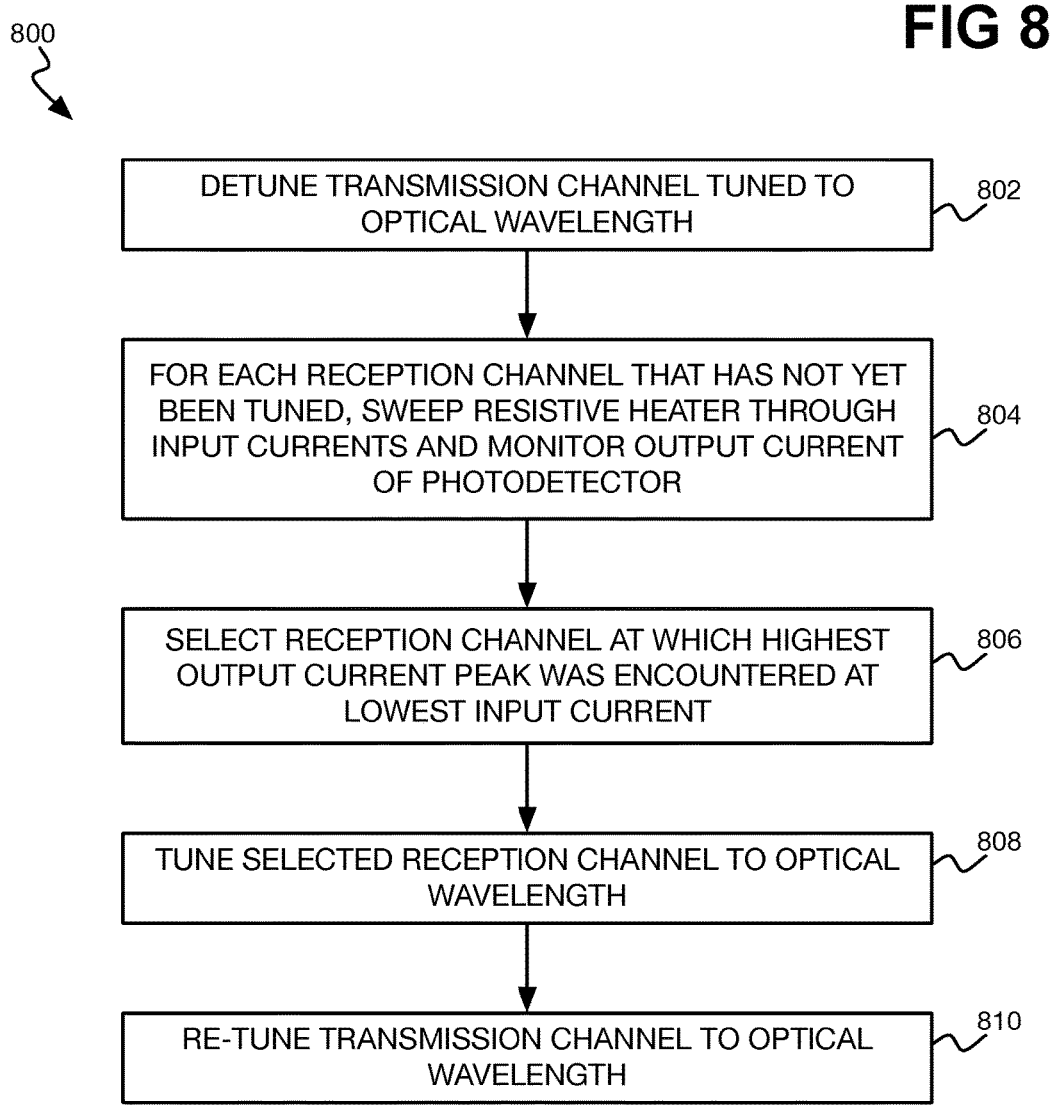
FIG. 8 is a of an example method for tuning an optical reception channel of an optical receiver to a resonant wavelength.

FIG. 8 shows an example method 800 for tuning an optical reception channel of an optical receiver to a resonant wavelength to which an optical transmission channel of an optical transmitter has already been tuned. The method 800 is performed for each resonant wavelength to which a transmission channel has been tuned, such as in order from the first transmission channel to the last transmission channel, until all of the resonant wavelengths have had reception channels tuned thereto. Therefore, part 504 of the method 500 of FIG. 5 can be implemented by performing the method 800 for each resonant wavelength to which a transmission channel of the optical transmitter has been tuned. Parts 804, 806, and 808 can be implemented as program code stored on a non-transitory computer-readable data storage medium that the optical receiver executes.

The optical transmission channel tuned to the optical wavelength in question (i.e., in relation to which the method 800 is currently being performed) is temporarily detuned from this wavelength (802). The resistive heater of each optical reception channel that has not yet been tuned to an optical wavelength is swept through a range of input currents and the output current of the photodetector of the reception channel monitored (804). Part 804 is performed for each reception channel on a reception channel-by-reception channel basis, such as in order from the first reception channel that has not yet been tuned to the last reception channel that has not yet been tuned.

Part 804 thus corresponds to parts 602 and 604 of the method 600 of FIG. 6, but is performed in relation to an optical reception channel instead of an optical transmission channel. As the resistive heater of a reception channel is swept through its input current range, the output current of its photoconductor moves through peaks correspond to the resonant wavelengths. The highest peak encountered within the photodetector output current of a reception channel corresponds to the resonant wavelength to which the detuned optical transmission channel was tuned.

The optical reception channel at which the highest output current peak was encountered at the lowest input current is selected (806). The selected reception channel is tuned to the optical wavelength in question (808), and the optical transmission channel is again also tuned to the wavelength (810). Tuning the reception channel at which the highest output current was encountered at the lowest input current to the optical wavelength reduces power consumption by the optical receiver.

Specifically, when the method 800 is performed, just one transmission channel is detuned. This means that each reception channel encounters a number of output current peaks lower than the threshold distinguishing between wavelengths to which transmission channels have been tuned and wavelengths to which transmission channels have not been tuned, and one output current peak greater than this threshold, which is the highest output current peak. Selecting the reception channel that encounters its highest output current peak at the lowest input current thus reduces power consumption for the optical receiver to tune to the resonant wavelength in relation to which the method 800 is performed.

Figure 9:
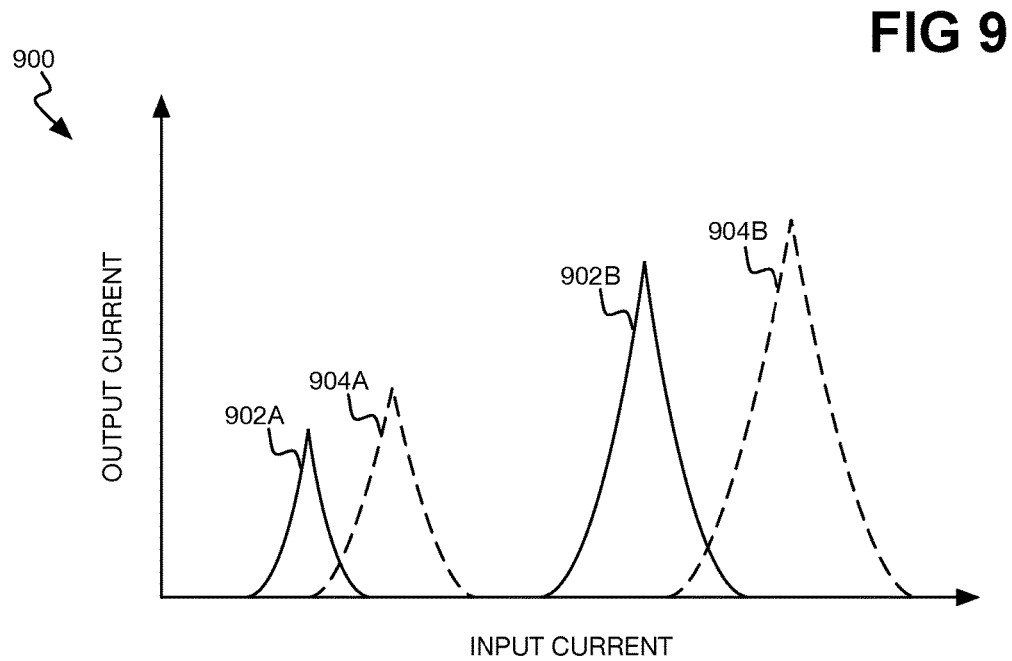
FIG. 9 is an example graph of photodetector output current by resistive heater input current for two optical reception channels of an optical receiver.

FIG. 9 shows an example graph 900 of photodetector output current by resistive heater input current for two optical reception channels of an optical receiver, when an optical transmission channel of an optical transmitter has been temporarily detuned from its resonant wavelength. The example graph 900 illustrates performance of part 804 of the method 800 of FIG. 8 after part 802 has been performed. In the graph 900, the photodetector output current of a first optical reception channel is indicated by a solid line, inclusive of output current peaks 902A and 902B, which are collectively referred to as the peaks 902. The photoconductor output current of a second optical reception channel is indicated by a dashed line, inclusive of output current peaks 904A and 904B, which are collectively referred to as the peaks 904.

In FIG. 9, the photoconductor of the first optical reception channel reaches its highest output current peak 902B at a lower resistive heater input current than the photoconductor of the second optical reception channel reaches its highest output current 904B. Therefore, in part 806 of the method 800 of FIG. 8, the first reception channel is selected and is tuned to the resonant wavelength of the temporarily detuned optical transmission channel in part 808 (along with this optical transmission channel in part 810). The first reception channel is selected in part 806 even though the output current peak 904B of the second reception channel is higher than the output current peak 904A of the first reception channel. Furthermore, in the method 800, the non-highest output current peaks 902A and 904A of both reception channels do not affect the selection of which reception channel to tune to the resonant wavelength of the temporarily detuned transmission channel.

The techniques that have been described herein therefore select which optical transmission channels of an optical transmitter and which optical reception channels of an optical transmitter are tuned to which resonant wavelengths so that the optical transmitter can optically communicate with the optical receiver. The selection process reduces power consumption at both the optical transmitter and the optical receiver. At the optical transmitter, power consumption is reduced because each transmission channel that has not yet been tuned to a resonant wavelength is tuned to the resonant wavelength that has not yet been tuned to by any transmission channel to which the transmission channel in question can tune at a lowest input current. At the optical receiver, power consumption is reduced because each resonant wavelength that has been tuned by a transmission channel is tuned to by the reception channel that can tune to the wavelength in question at a lowest input current.

I claim:

1. A method for tuning optical transmission channels of an optical transmitter to optical wavelengths, comprising:
   for each optical transmission channel of the optical transmitter:
     sweeping a resistive heater of the optical transmission channel through a range of input currents to vary an operative optical wavelength that an optical modulator of the optical transmission channel modulates in accordance with an input data bitstream;
     as the resistive heater is swept through the range of input currents, monitoring an output current of a photodetector of the optical transmission channel that monitors the modulated operative optical wavelength; and
     tuning the optical transmission channel to the optical wavelength corresponding to a lowest input current of the resistive heater at which a peak greater than a threshold was encountered within the monitored output current of the photodetector.

2. The method of claim 1, wherein sweeping the resistive heater through the input currents, monitoring the output current of the photodetector, and tuning the optical transmission channel are successively performed for each optical transmission channel from a first optical transmission channel through a last optical transmission channel.

3. The method of claim 1, wherein as the resistive heater is swept through the range of input currents, the output current of the photodetector moves through a plurality of peaks in correspondence with resonant wavelengths, and the peaks are mapped to the input currents at which the peaks occur.

4. The method of claim 1, wherein as the optical transmission channels are tuned to the optical wavelengths, the peaks within the monitored output current of the photodetector that are encountered when the resistive heater is set to the input currents to which the optical wavelengths correspond attenuate.

5. The method of claim 4, wherein the threshold is set to distinguish whether any optical transmission channel has been tuned to a resonant wavelength corresponding to an encountered peak within the monitored output current.

6. The method of claim 1, further comprising, after the optical transmission channels have been tuned to the optical wavelengths:
repeating the method one or more times to retune the optical transmission channels to dampen effects of thermal crosstalk among the optical transmission channels.

7. The method of claim 1, further comprising, after the optical transmission channels have been tuned to the optical wavelengths:
tuning optical reception channels of an optical receiver that is optically coupled to the optical transmitter, to the optical wavelengths to which the optical transmission channels have been tuned.

8. A non-transitory computer-readable data storage medium storing program code executable by an optical receiver to tune optical reception channels of the optical receiver to optical wavelengths to which optical transmission channels of an optical transmitter have already been tuned, the optical receiver tuning the optical reception channels by:
as the optical transmission channels are individually detuned, for a currently detuned optical transmission channel having a corresponding optical wavelength:
for each optical reception channel of the optical receiver that has not yet been tuned:
sweeping a resistive heater of the optical reception channel through a range of input currents to vary an operative optical wavelength that an optical demodulator of the optical reception channel demodulates to generate an output data bitstream;
as the resistive heater is swept through the range of input currents, monitoring an output current of a photodetector of the optical reception channel that monitors the demodulated operative optical wavelength;
selecting the optical reception channel at which a highest peak was encountered within the monitored output current of the photodetector at a lowest input current of the resistive heater; and
tuning the selected optical reception channel to the corresponding optical wavelength of the current detuned optical transmission channel.

9. The non-transitory computer-readable data storage medium of claim 8, wherein the currently detuned optical transmission channel is again tuned to the corresponding optical wavelength thereof after the selected optical reception channel has been tuned to the corresponding optical wavelength, before another optical transmission channel is detuned.

10. The non-transitory computer-readable data storage medium of claim 8, wherein sweeping the resistive heater through the input currents and monitoring the output current of the photodetector are successively performed for each optical reception channel from a first optical reception channel that has not yet been tuned through a last optical reception channel that has not yet been tuned.

11. The non-transitory computer-readable data storage medium of claim 8, wherein as the resistive heater is swept through the range of input currents, the output current of the photodetector moves through a plurality of peaks in correspondence with resonant wavelengths, and the peaks are mapped to the input currents at which the peaks occur.

12. The non-transitory computer-readable data storage medium of claim 8, wherein, for each optical reception channel of the optical receiver, the highest peak encountered within the monitored output current of the photodetector corresponds to the corresponding optical wavelength of the currently detuned optical transmission channel.

13. The non-transitory computer-readable data storage medium of claim 8, wherein, after the optical reception channels have been tuned to the optical wavelengths, the optical receiver repeatedly retunes the optical transmission channels one or more times to dampen effects of thermal crosstalk among the optical reception channels.

14. A system comprising:
an optical transmitter having a plurality of optical transmission channels that are successively tuned to resonant wavelengths at which lowest transmission channel input currents of the optical transmission channels result in transmission channel output current peaks greater than a threshold, wherein each optical transmission channel comprises:
a transmission channel resistive heater that selects an operative optical wavelength of the optical transmission channel in correspondence with a transmission channel input current applied to the transmission channel resistive heater;
an optical modulator that modulates the selected operative optical wavelength in accordance with an input data bitstream; and
a transmission channel photodetector that outputs a transmission channel output current in correspondence with resonance of the modulated selected operative optical wavelength with the resonant wavelengths; and
an optical receiver having a plurality of optical reception channels that are tuned to the resonant wavelengths after the optical transmission channels are tuned, wherein each optical reception channel of the optical receiver comprises:
a reception channel resistive heater that selects an operative optical wavelength of the optical reception channel in correspondence with a reception channel input current applied to the reception channel resistive heater;
an optical demodulator that demodulates the selected operative optical wavelength to generate an output data bitstream; and
a reception channel photodetector that outputs a reception channel output current in correspondence with resonance of the demodulated selected operative optical wavelength with the resonant wavelengths as received through the optical transmitter,
wherein each resonant wavelength has the optical reception channel tuned thereto that has a highest reception channel output current peak at a lowest reception channel input current when the optical transmission channel tuned to the resonant wavelength is temporarily detuned.

15. The system of claim 14, further comprising:
a comb laser source to output the resonant wavelengths to the optical transmitter.

16. The system of claim 14, wherein the optical transmitter and the optical receiver establish a mapping between the optical transmission channels and the optical reception channels by the resonant wavelengths to which the optical transmission channels and the optical reception channels have been tuned.

17. The system of claim 16, wherein the optical transmitter and the optical receiver establish the mapping by:
the optical transmitter temporarily detuning the optical transmission channels in order from a first optical transmission channel to a last optical transmission channel.

18. The system of claim 16, wherein the optical transmitter and the optical receiver establish the mapping by:
the optical transmitter transmitting on each optical transmission channel data indicating an identity of the optical transmission channel.

* * * * *